United States Patent
Botha et al.

(10) Patent No.: US 11,728,053 B2
(45) Date of Patent: Aug. 15, 2023

(54) HEAT PIPE NETWORKS FOR HEAT REMOVAL, SUCH AS HEAT REMOVAL FROM NUCLEAR REACTORS, AND ASSOCIATED SYSTEMS AND METHODS

(71) Applicant: NuScale Power, LLC, Portland, OR (US)

(72) Inventors: Frederick Botha, Corvallis, OR (US); Jackson Keppen, Corvallis, OR (US); Azat Yumadilovich Galimov, Albany, OR (US)

(73) Assignee: NuScale Power, LLC, Portland, OR (US)

( * ) Notice: Subject to any disclaimer, the term of this patent is extended or adjusted under 35 U.S.C. 154(b) by 60 days.

(21) Appl. No.: 17/071,838

(22) Filed: Oct. 15, 2020

(65) Prior Publication Data

US 2021/0125737 A1    Apr. 29, 2021

Related U.S. Application Data

(60) Provisional application No. 62/915,467, filed on Oct. 15, 2019.

(51) Int. Cl.
*G21C 15/257*    (2006.01)
*F28D 15/02*    (2006.01)
(Continued)

(52) U.S. Cl.
CPC ....... *G21C 15/257* (2013.01); *F28D 15/0275* (2013.01); *G21C 15/182* (2013.01); *F28D 2021/0054* (2013.01)

(58) Field of Classification Search
CPC ..... G21C 15/257; G21C 1/022; H01L 23/427; F28D 2021/0054
See application file for complete search history.

(56) References Cited

U.S. PATENT DOCUMENTS 1,690,108 A * 11/1928 Grady ................ F28D 15/0275
165/104.19
3,152,260 A * 10/1964 Cummings ............ F03G 6/065
244/57
(Continued)

FOREIGN PATENT DOCUMENTS

CA        776219 A    1/1968
CN     104759627 A    7/2015
(Continued)

OTHER PUBLICATIONS

Anderson, J. et al. Reactivity Control of Fast-Spectrum Reactors by Reversible Hydriding of Yttrium Zones. NASA Technical Note D-4615, 1968. 37 pages.
(Continued)

*Primary Examiner* — Lily C Garner
(74) *Attorney, Agent, or Firm* — Perkins Coie LLP

(57) ABSTRACT

Nuclear reactor systems and associated devices and methods are described herein. A representative nuclear reactor system includes a heat pipe network having an evaporator region, an adiabatic region, and a condenser region. The heat pipe network can define a plurality of flow paths having an increasing cross-sectional flow area in a direction from the evaporator region toward the condenser region. The system can further include nuclear fuel thermally coupled to at least a portion of the evaporator region. The heat pipe network is positioned to transfer heat received from the fuel at the evaporator region, to the condenser region. The system can further include one or more heat exchangers thermally coupled to the evaporator region for transporting the heat out of the system for use in one or more processes, such as generating electricity.

17 Claims, 9 Drawing Sheets

(51) Int. Cl.
*G21C 15/18* (2006.01)
*F28D 21/00* (2006.01)

(56) References Cited

U.S. PATENT DOCUMENTS

| | | | | |
|---|---|---|---|---|
| 3,285,822 | A | | 11/1966 | Tunstall |
| 4,082,863 | A | | 4/1978 | Dancy et al. |
| 4,245,380 | A | * | 1/1981 | Maxson ............... F25B 23/006 29/890.032 |
| T101,204 | I4 | * | 11/1981 | Hampel ................ F28D 15/02 376/221 |
| 4,632,179 | A | * | 12/1986 | Meijer ................ F28D 15/046 165/47 |
| 4,755,350 | A | | 7/1988 | Kennel |
| 4,851,183 | A | * | 7/1989 | Hampel ................ G21C 13/00 976/DIG. 134 |
| 4,903,761 | A | * | 2/1990 | Cima ................ F28D 15/043 165/41 |
| 5,117,901 | A | * | 6/1992 | Cullimore ............... B64G 1/50 244/172.6 |
| 5,195,575 | A | * | 3/1993 | Wylie ................ G21C 15/18 376/367 |
| 5,647,429 | A | * | 7/1997 | Oktay ............... H05K 7/20809 165/104.33 |
| 5,684,848 | A | * | 11/1997 | Gou ................ F28D 15/04 376/367 |
| 5,932,885 | A | | 8/1999 | Debellis et al. |
| 6,353,651 | B1 | * | 3/2002 | Gou ................ G21C 9/016 376/288 |
| 8,073,096 | B2 | * | 12/2011 | El-Genk ............ F28D 15/0266 376/383 |
| 9,824,890 | B2 | | 11/2017 | Young et al. |
| 10,192,740 | B2 | | 1/2019 | Young et al. |
| 10,643,756 | B2 | * | 5/2020 | McClure ............ G21C 15/257 |
| 10,903,389 | B2 | | 1/2021 | Schulte et al. |
| 10,910,116 | B2 | * | 2/2021 | Mckellar ................ G21C 5/02 |
| 11,158,432 | B1 | * | 10/2021 | Reid ................ G21C 15/257 |
| 2003/0141045 | A1 | | 7/2003 | Oh et al. |
| 2010/0040187 | A1 | * | 2/2010 | Ahlfeld ................ G21C 5/18 376/367 |
| 2010/0119027 | A1 | * | 5/2010 | Peterson ................ G21C 7/26 376/219 |
| 2010/0212656 | A1 | * | 8/2010 | Qiu ................ F24S 60/10 165/4 |
| 2012/0051481 | A1 | * | 3/2012 | Shu ................ G21C 5/02 376/174 |
| 2014/0348287 | A1 | | 11/2014 | Huke et al. |
| 2016/0290235 | A1 | * | 10/2016 | Ekanayake ............ F01D 9/065 |
| 2016/0293281 | A1 | * | 10/2016 | Katono ................ G21C 9/012 |
| 2018/0033501 | A1 | * | 2/2018 | Kimura ................ G21C 3/22 |
| 2018/0075931 | A1 | | 3/2018 | Arafat et al. |
| 2018/0224215 | A1 | | 8/2018 | Thiers et al. |
| 2018/0226159 | A1 | * | 8/2018 | Sterbentz ............... G21C 3/626 |
| 2018/0268950 | A1 | * | 9/2018 | McKellar ............... G21D 1/006 |

FOREIGN PATENT DOCUMENTS

| | | | |
|---|---|---|---|
| CN | 111128413 | A | 5/2020 |
| EP | 3406094 | A1 | 11/2018 |
| GB | 1197880 | A | 7/1970 |
| JP | H07294174 | A | 11/1995 |
| RU | 2650885 | C1 | 4/2018 |
| WO | WO1997008483 | A2 * | 3/1997 |
| WO | 2009049397 | A1 | 4/2009 |
| WO | 2010019199 | A1 | 2/2010 |

OTHER PUBLICATIONS

Greenspan, E. "Solid-Core Heat-Pipe Nuclear Battery Type Reactor" University of California at Berkeley, Department of Nuclear Engineering, Sep. 30, 2008. 109 pages.

ISA, International Search Report and Written Opinion for International Patent Application No. PCT/US2020/055819. dated Mar. 5, 2021. 15 pages.

Peterson, G.P. "Introduction to Heat Pipe: Modeling, Testing, and Applications: 1st Edition" Wiley & Sons, Inc. 1994, pp. 44-76.

Rohsenow, W. et al. "Handbook of Heat Transfer: 3rd Edition" McGraw Hill, 2008, pp. 12.1-12.20.

Vetrano, J. (1971). Hydrides as neutron moderator and reflector materials. Nuclear Engineering and Design, 14(3), pp. 390-412.

Sterbentz, J. et al. (2017) Special Purpose Nuclear Reactor (5MW) for Reliable Power at Remote Sites Assessment Report. Idaho National Laboratory. INL/EXT-16-40741.

ISA, International Search Report and Written Opinion for International Application No. PCT/US2020/055822. dated Apr. 23, 2021. 19 pages.

Wikipedia, "Hydrogen-moderated self-regulating nuclear power module" retrieved May 28, 2021 from: https://en.wikipedia.org/wiki/Hydrogen-moderated_self-regulating_nuclear_power_module#:~:text=The%20hydrogen%2Dmoderated%20self%2Dregulating,hydride%20as%20a%20neutron%20moderator. 2 pages.

ISA, International Search Report and Written Opinion for International Application No. PCT/US2021/046253. dated Dec. 9, 2021. 8 pages.

ISA, International Search Report and Written Opinion for International Application No. PCT/US2021/046265. dated Feb. 18, 2022. 10 pages.

* cited by examiner

HEAT PIPE NETWORKS FOR HEAT REMOVAL, SUCH AS HEAT REMOVAL FROM NUCLEAR REACTORS, AND ASSOCIATED SYSTEMS AND METHODS

CROSS REFERENCE TO RELATED APPLICATION

This application claims priority to U.S. Provisional Patent Application No. 62/915,467, filed Oct. 15, 2019, and titled "HEAT PIPE NETWORKS FOR HEAT REMOVAL, SUCH AS HEAT REMOVAL FROM NUCLEAR REACTORS, AND ASSOCIATED SYSTEMS AND METHODS," which is incorporated herein by reference in its entirety.

TECHNICAL FIELD

The present technology relates generally to nuclear reactors and associated systems and methods and, more particularly, to nuclear reactors having heat pipes for removing heat generated by a nuclear fuel.

BACKGROUND

Power plants come in many different shapes and sizes. Large power plants can be used to provide electricity to a geographic area, whereas relatively small power plants can be used to power, for example, local areas, submarines, space craft, etc. In addition to providing electricity, power plants can be used for a myriad of additional or different purposes, from desalinating seawater to creating nuclear isotopes for medical purposes. Similarly, the types of power plants that are available cover a wide spectrum of technologies including gas-powered, coal-fired, and nuclear-powered, to name a few.

To date, nuclear reactor designs that use heat pipes as a means for heat removal from a core of nuclear material maintain constant heat pipe flow area in discreet unconnected heat pipes. For a given reactor core geometry, heat removal is limited by the total effective heat pipe flow area and the fraction of the core volume occupied by the heat pipes. For example, a larger number of heat pipes will increase the total effective flow area and heat removal capacity but will also displace fuel and other core material, which will reduce the heat production potential of the core.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1:
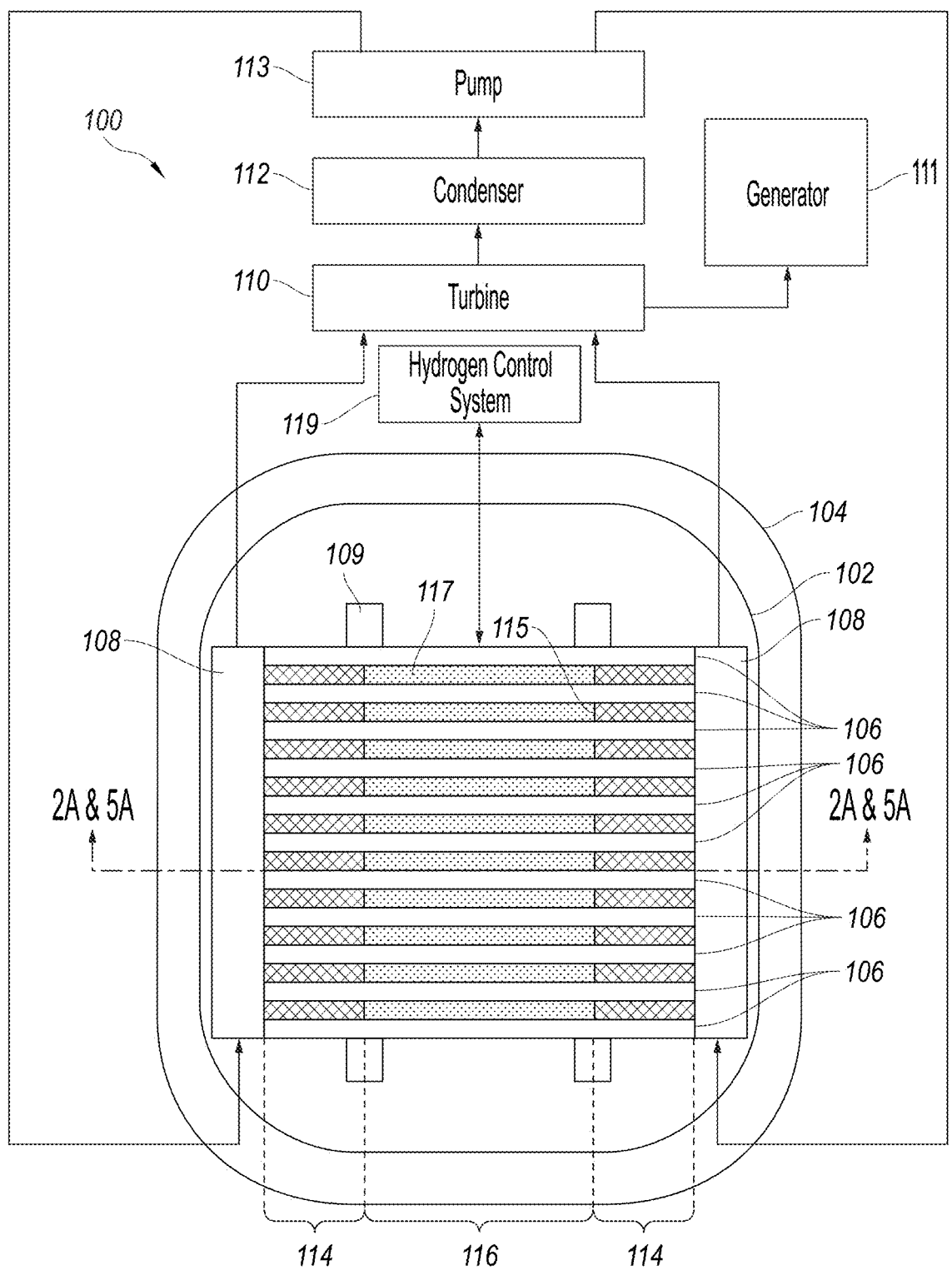
FIG. 1 is a partially schematic side cross-sectional view of a nuclear reactor system configured in accordance with embodiments of the present technology.

Aspects of the present disclosure are directed generally toward nuclear reactor systems. In several of the embodiments described below, a representative nuclear reactor system includes a network of interconnected heat pipes having an evaporator region, an adiabatic region, and a condenser region. The heat pipes are configured to contain a working fluid, and the network of heat pipes can define an increasing cross-sectional flow area for the working fluid in a direction from the evaporator region toward the condenser region. The system can further include a nuclear fuel, such as a fissile material, configured to generate heat and thermally coupled to at least a portion of the evaporator region. The network of heat pipes is configured to transfer the heat from the evaporator region to the condenser region. The system can further include one or more heat exchangers thermally coupled to the condenser region for transporting the heat out of the system for use in one or more processes, including, but not limited to, generating electricity.

In one aspect of the present technology, the increasing flow area of the heat pipes can increase the heat removal capacity of the heat pipes as compared to, for example, conventional heat pipes having a single pipe of constant flow area. In some embodiments, the heat pipes can branch or bifurcate in the direction from the evaporator region toward the condenser region to increase the flow area of the network of heat pipes.

In some embodiments, the network of heat pipes can be provided in a heat pipe layer, and the nuclear reactor system can include a plurality of stacked heat pipe layers. In one aspect of the present technology, the number of heat pipe layers can be varied in accordance with, for example, the amount of fuel in the system, and thus the power/heat output of the system. In another aspect of the present technology, the heat pipe layers can be loosely coupled to a common frame and/or other ones of the heat pipe layers. This can allow the heat pipe layers to expand/contract independently due to heat and/or irradiation—thereby reducing mechanical stress on the heat pipe layers, the frame, and/or other components of the system. In some embodiments, to refuel the system, one or more of the heat pipe layers—and the fuel attached to or otherwise associated therewith—can be removed and replaced and/or shifted to another location within the stack of heat pipe layers, for example, without requiring the entire network of heat pipes to be removed.

In some embodiments, the fuel can be directly attached to the evaporator region of the heat pipes, which can provide a high thermal coupling between the fuel and the heat pipes. For example, the fuel can be formed on the heat pipes using a hot isostatic pressing (HIP) process.

Certain details are set forth in the following description and in FIGS. 1-5C to provide a thorough understanding of various embodiments of the present technology. In other instances, well-known structures, materials, operations, and/or systems often associated with nuclear reactors, heat pipes, heat exchangers, etc., are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

FIG. 1 is a partially schematic side cross-sectional view of a nuclear reactor system 100 ("system 100") configured in accordance with representative embodiments of the present technology. In the illustrated embodiment, the system 100 includes a reactor container 102 and a radiation shield container 104 surrounding/enclosing the reactor container 102. In some embodiments, the reactor container 102 and the radiation shield container 104 can be roughly cylinder-shaped or capsule-shaped. The system 100 further includes a plurality of heat pipe layers 106 within the reactor container 102. In the illustrated embodiment, the heat pipe layers 106 are spaced apart from and stacked over one another. In some embodiments, the heat pipe layers 106 can be mounted/secured to a common frame 109, a portion of the reactor container 102 (e.g., a wall thereof), and/or other suitable structures within the reactor container 102. In other embodiments, the heat pipe layers 106 can be directly stacked on top of one another such that each of the heat pipe layers 106 supports and/or is supported by one or more of the other ones of the heat pipe layers 106.

In the illustrated embodiment, the system 100 further includes a shield or reflector region 114 at least partially surrounding a core region 116. The heat pipe layers 106 can be circular, rectilinear, polygonal, and/or can have other shapes, such that the core region 116 has a corresponding three-dimensional shape (e.g., cylindrical, spherical, etc.). In some embodiments, the core region 116 is separated from the reflector region 114 by a core barrier 115, such as a metal wall. The core region 116 can include one or more fuel sources, such as fissile material, for heating the heat pipe layers 106. The reflector region 114 can include one or more materials configured to contain/reflect products generated by burning the fuel in the core region 116 during operation of the system 100. For example, the reflector region 114 can include a liquid or solid material configured to reflect neutrons and/or other fission products radially inward toward the core region 116. In some embodiments, the reflector region 114 can entirely surround the core region 116. In other embodiments, the reflector region 114 may only partially surround the core region 116. In some embodiments, the core region 116 can include a control material 117, such as a moderator and/or coolant. The control material 117 can at least partially surround the heat pipe layers 106 in the core region 116 and can transfer heat therebetween. In some embodiments, as described in greater detail below, the control material 117 can be a liquid moderator (e.g., a liquid metal alloy, a liquid metal hydride) configured to control the reactivity of the system 100.

In the illustrated embodiment, the system 100 further includes at least one heat exchanger 108 positioned around the heat pipe layers 106. The heat pipe layers 106 can extend from the core region 116 and at least partially into the reflector region 114, and are thermally coupled to the heat exchanger 108. As described in greater detail below with reference to FIGS. 4A and 4B, the heat exchanger 108 can be positioned outside of or partially within the reflector region 114. As described in greater detail below with reference to FIGS. 2A-5C, the heat pipe layers 106 can each include an array of heat pipes that provide a heat transfer path from the core region 116 to the heat exchanger 108. During operation of the system 100, the fuel in the core region 116 can heat and vaporize a fluid within the heat pipes in the heat pipe layers 106, and the fluid can carry the heat to the heat exchanger 108.

In some embodiments, the heat exchanger 108 can include one or more helically-coiled tubes that wrap around the heat pipe layers 106. The tubes of the heat exchanger 108 can include or carry a working fluid (e.g., a coolant such as water or another fluid) that carries the heat from the heat pipe layers 106 out of the reactor container 102 and the radiation shield container 104 for use in generating electricity, steam, etc. For example, in the illustrated embodiment the heat exchanger 108 is operably coupled to a turbine 110, a generator 111, a condenser 112, and a pump 113. As the working fluid within the heat exchanger 108 increases in temperature, the working fluid may begin to boil and vaporize. The vaporized working fluid (e.g., steam) may be used to drive the turbine 110 to convert the thermal potential energy of the working fluid into electrical energy via the generator 111. The condenser 112 can condense the working fluid after it passes through the turbine 110, and the pump 113 can direct the working fluid back to the heat exchanger 108, where it can begin another thermal cycle.

Figure 2A:
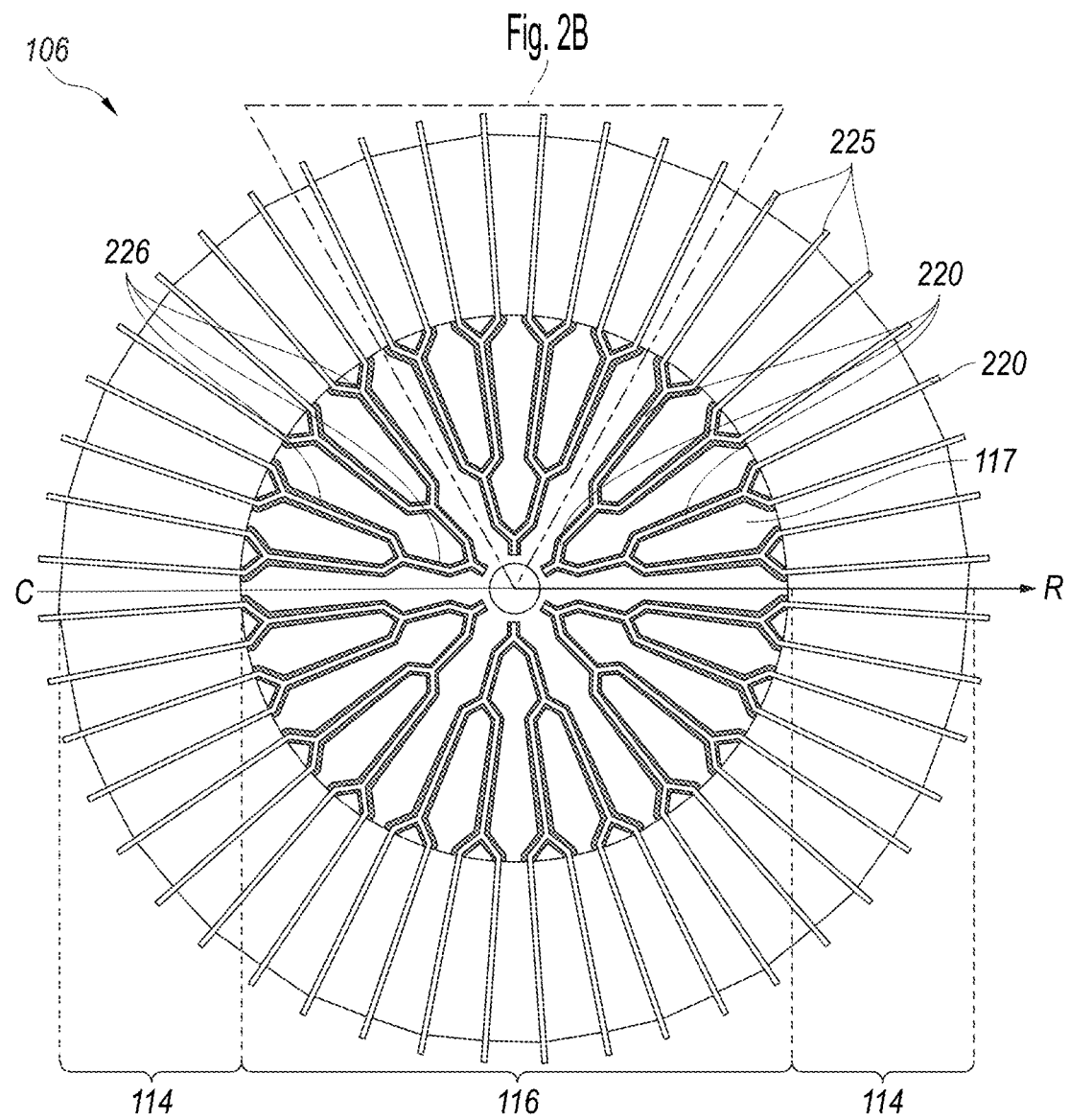
FIGS. 2A and 2B are a top cross-sectional view and an enlarged top cross-sectional view, respectively, of a reflector region and a core region of the nuclear reactor system configured in accordance with embodiments of the present technology.
Figure 2B:
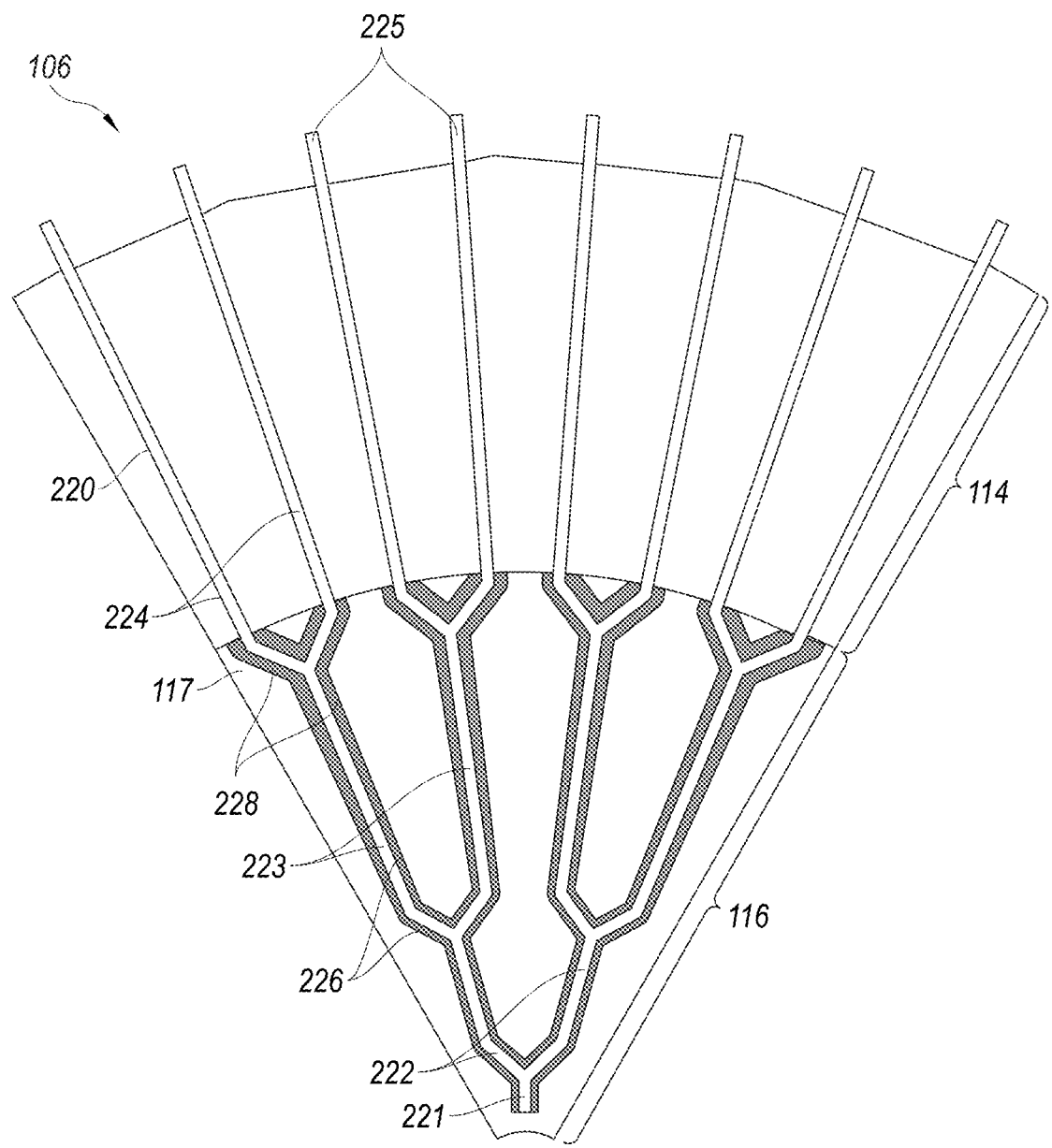

FIGS. 2A and 2B are a top cross-sectional view and an enlarged top cross-sectional view, respectively, of the reflector region 114 and the core region 116 configured in accordance with representative embodiments of the present technology. More specifically, FIG. 2A illustrates one of the heat pipe layers 106. In the illustrated embodiment, the heat pipe layer 106 includes a network of at least partially interconnected heat pipes 220. The heat pipes 220 can be separate tubes, channels formed in/between one or more solid members, and/or other structures configured (e.g., positioned and shaped) to provide one or more flow paths (e.g., for a working fluid contained therein).

The heat pipes 220 can have a branching/tapering arrangement in which the heat pipes 220 bifurcate as they extend radially outward in a direction from the reactor container 102 toward the reflector region 114 (e.g., in a direction away from a central axis C of the heat pipe layer 106 as indicated by arrow R in FIG. 2A). More specifically, referring to FIG. 2B, the heat pipes 220 can comprise first portions 221 that are positioned radially inward of and bifurcate into (e.g., divide into, connect to, etc.) second portions 222. Likewise, the second portions 222 can be positioned radially inward of and bifurcate into third portions 223, the third portions 223 can be positioned radially inward of and bifurcate into fourth portions 224, and so on. In some embodiments, the heat pipes 220 include more or fewer bifurcations. The heat pipes 220 can all be fluidly connected together, or two or more different subsets of the heat pipes 220 can be fluidly connected together. For example, a subset or branch of the heat pipes 220 (e.g., a wedge-shaped branch shown in FIG. 2B) including one of the first portions 221 and its progeny—for example, two of the second portions 222, four of the third portions 223, eight of the fourth portions 224, and so on—can be connected together. Adjacent wedge-shaped branches can be independent of each other, or individual wedge-shaped branches can be connected together (e.g., at the entrances of the adjacent first portions 221).

Figure 2C:
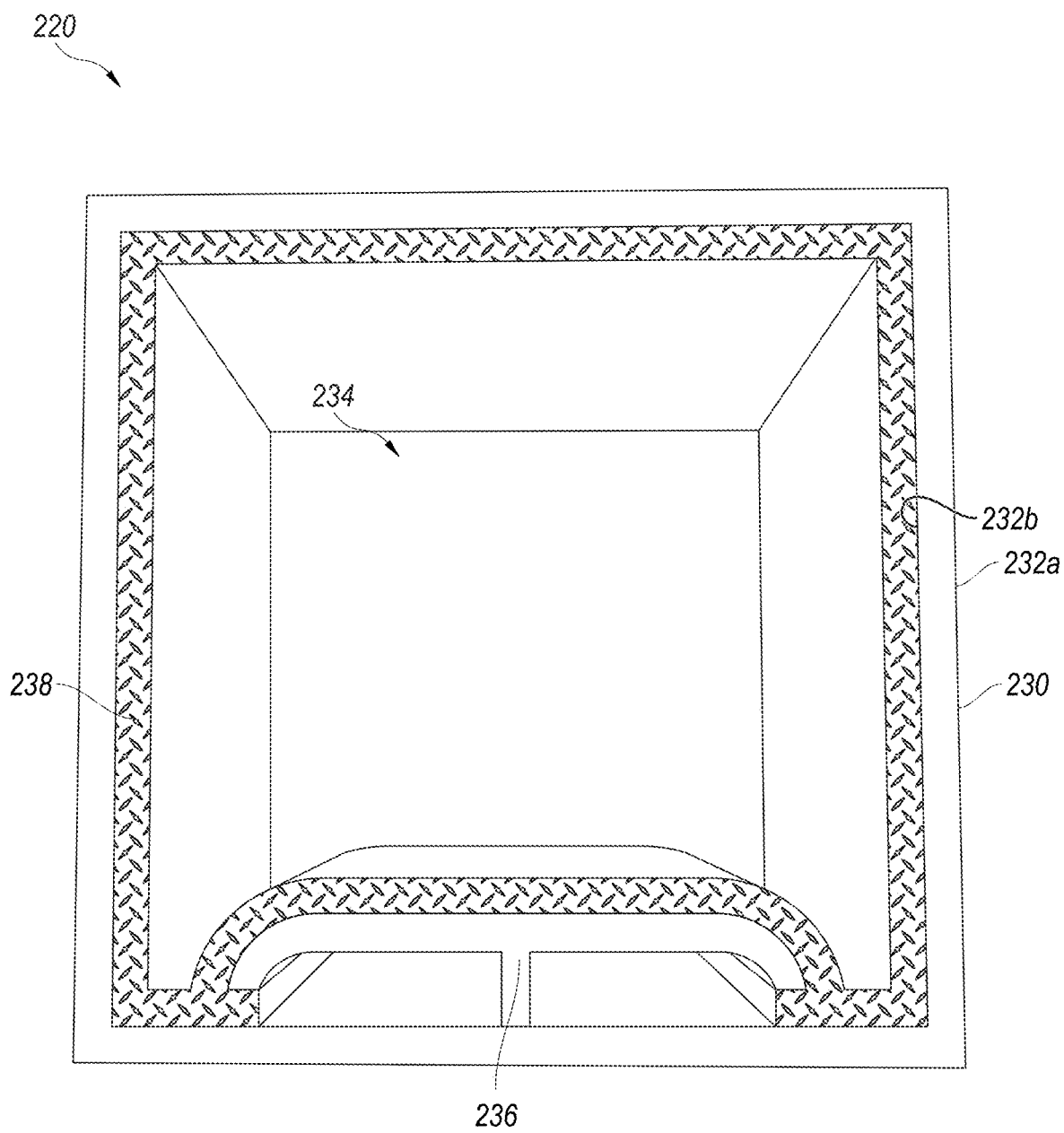
FIG. 2C is a cross-sectional isometric view of a heat pipe of the nuclear reactor system configured in accordance with embodiments of the present technology.

FIG. 2C is a cross-sectional isometric view of one of the heat pipes 220 configured in accordance with embodiments of the present technology. In the illustrated embodiment, the heat pipe 220 includes an outer wall 230 having an outer surface 232a and an inner surface 232b, and defining a channel 234. The heat pipe 220 includes a working fluid (not shown) that is contained within the channel 234. The working fluid can be a two-phase metal (e.g., liquid and vapor phase) such as, for example, sodium or potassium. The wall 230 can be formed from any suitably strong, thermally conductive, and neutronic resistant material such as, for example, one or more metal or ceramic materials. In a particular embodiment, the wall 230 comprises molybdenum alloy. In the illustrated embodiment, the wall 230 has a generally square cross-sectional shape while, in other embodiments, the wall 230 can have a circular, rectangular, polygonal, irregular, or other cross-sectional shape.

The heat pipe 220 further includes a first mesh or wick 236 extending along/over a portion of the inner surface 232b, such as a lower/floor portion of the inner surface 232b (e.g., relative to gravity). The heat pipe 220 can further include a second mesh or wick 238 extending along/over all or a portion of the rest of the inner surface 232b and the first wick 236. In some embodiments, the first wick 236 is a coarse wick capable of relatively high throughput of the working fluid compared to the second wick 238. The second wick 238 can be a fine wick configured to pump the working fluid against a larger pressure gradient than the first wick 236, but for shorter distances that the first wick 236. Accordingly, the first and second wicks 236, 238 can together form a compound wick in which (i) the first wick 236 allows for long distance flow of the working fluid and (ii) the second wick 238 allows for localized flow of the working fluid. In other embodiments, the heat pipe 220 can include other wick arrangements (e.g., compound or single wick arrangements) for promoting the flow of the working fluid through the channel 234 of the heat pipe 220.

Referring to FIGS. 2A-2C together, the heat pipes 220 extend radially outward from the central axis C at least partially through (i) the core region 116 and the control material 117 therein and (ii) the reflector region 114. More specifically, in some embodiments the first, second, and third portions 221-223 of the heat pipes 220 are positioned within the core region 116, while the fourth portions 224 extend through the reflector region 114. In the illustrated embodiment, the fourth portions 224 of the heat pipes 220 extend entirely through the reflector region 114 such that an outward terminus 225 of the heat pipes 220 is positioned radially outside of the reflector region 114.

Fuel 226 (FIG. 2B) is positioned around/proximate to the heat pipes 220 in the core region 116 (e.g., on the first, second, and third portions 221-223 of the heat pipes 220). In some embodiments, the fuel 226 can be a solid metallic fuel including fissile material, such as a uranium molybdenum alloy having high thermal conductivity and a high density of fissile material. In some embodiments, the fuel 226 can be inserted into slots (not shown) along the heat pipes 220 or the structure supporting the heat pipes 220 (e.g., the frame 109 shown in FIG. 1) such that there is no gap or only a small gap between the walls 330 of the heat pipes 220 and the fuel 226. In such embodiments, the slots can cover the fuel 226 and act as a cladding that inhibits or even prevents growth of the fuel 226 and/or the escape of fission products. In other embodiments, the fuel 226 can be directly formed on/attached to the heat pipes 220 using, for example, a hot isostatic pressing (HIP) process, sintering, additive manufacturing, and/or other suitable process.

Figure 3:
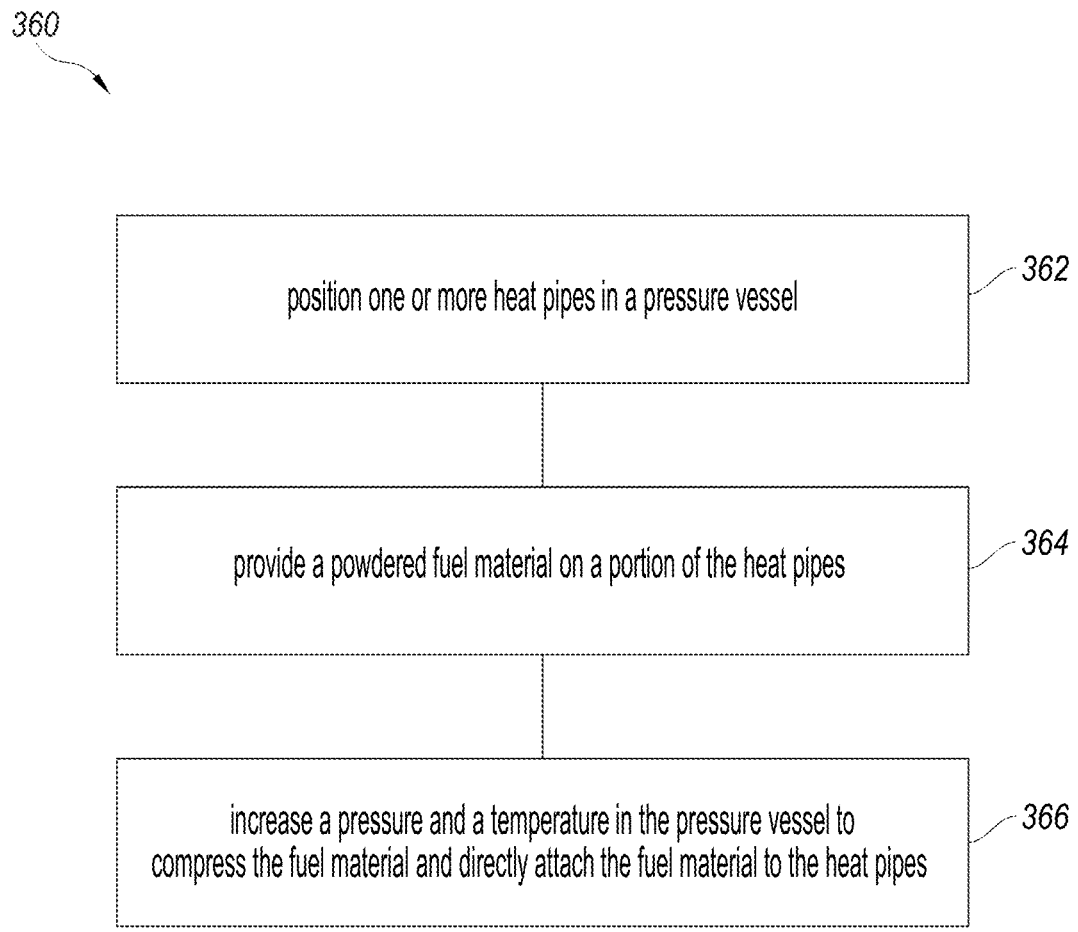
FIG. 3 is a flow diagram of a process or method for forming a nuclear fuel on a heat pipe of the nuclear reactor system using a hot isostatic pressing (HIP) process in accordance with embodiments of the present technology.

More specifically, FIG. 3 is a flow diagram of a process or method 360 for forming the fuel 226 on the heat pipes 220 (e.g., forming a nuclear reactor component) using a HIP process in accordance with embodiments of the present technology. At block 362, the method 360 includes positioning one or more of the heat pipes 220 in a pressure vessel. At block 364, the method 360 includes providing/depositing a powdered fuel material (e.g., a fissile material) on a portion of the heat pipes 220. For example, the fuel 226 can be provided as a metal powder (e.g., a powder of uranium molybdenum alloy) on the walls 230 of the heat pipes 220 to be located in the core region 116. The fuel 226 can be provided on the heat pipes 220 before or after the heat pipes 220 are positioned in the pressure vessel. At block 366, the method 360 includes increasing a pressure and a temperature in the pressure vessel to solidify/compress the fuel material and directly attach the fuel material to the heat pipes 220. For example, the increased temperature and pressure can compress the powdered fuel 226 into a compact solid on the walls 330 of the heat pipes 220. In some embodiments, increasing the pressure in the pressure vessel includes increasing an isostatic gas pressure in the pressure vessel by pumping an inert gas (e.g., argon) into the pressure vessel that does not react with the material of the heat pipes 220 or the fuel 226. In some embodiments, the temperature can be greater than about 450° C., greater than about 1000° C., greater than about 1300° C., or hotter. In some embodiments, the pressure can be greater than about 20 MPa, greater than about 50 MPa, greater than about 100 MPa, or higher.

Accordingly, referring to FIGS. 1-3 together, in one aspect of the present technology the fuel 226 can be physically attached to/integrated with the walls 330 of the heat pipes 220, which can provide a high thermal coupling between the fuel 226 and the heat pipes 220. In some embodiments, a cladding material can be formed around the fuel 226 using the same or a different process for attaching the fuel 226 to the heat pipes 220. For example, a HIP process can also be used to form a cladding layer around the fuel 226.

During system operation (e.g., after the fuel 226 and heat pipes 220 have been installed in the system 100), the fuel 226 generates heat that is transferred to the heat pipes 220 to evaporate/vaporize the working fluid therein. The first, second, and third portions 221-223 of the heat pipes 220 in the core region 116 can define an evaporator region of the heat pipes 220 in which the working fluid is heated and evaporated/vaporized. The evaporated working fluid then flows radially outward through the channels 234 along the fourth portions 224 of the heat pipes 220 (e.g., an adiabatic region of the heat pipes 220) through the reflector region 114 toward the outward termini 225 of the heat pipes 220 (e.g., a condenser region of the heat pipes 220) where the working fluid cools and condenses. The first and second wicks 236, 238 are configured to transport the condensed/cooled working fluid against the pressure gradient in the heat pipes 220 to the evaporator region of the heat pipes 220 where the working fluid can be heated and vaporized once again. Accordingly, in some embodiments heat is deposited into the evaporator region of the heat pipes 220, removed from the condenser region of the heat pipes 220, and neither removed from nor added to the heat pipes 220 in the adiabatic region. The vapor mass flow rate of the working fluid can increase over the length of the evaporator region and decrease over the length of the condenser region.

In one aspect of the present technology, the branching (e.g., fractionalizing, bifurcating) arrangement of the heat pipes 220 provides an increasing flow area (e.g., cross-sectional flow area) in the radial direction (e.g., in the direction indicated by the arrow R in FIG. 2A). That is, the heat pipes 220 originate from near a common point (e.g., the central axis C) and grow in flow area by branching from the first portions 221 to the second portions 222, from the second portions 222 to the third portions 223, and so on. This arrangement can increase the heat removal capacity of the heat pipes 220 as compared to conventional heat pipes having a single pipe of constant flow area.

More specifically, there are two at least two properties that affect the heat removal capacity of a heat pipe—the capillary limit and the sonic limit. The capillary limit occurs when the forces from the pressure difference across the length of the heat pipe exceed the capillary forces within the wick of the heat pipe, preventing the coolant liquid from reaching the end of the heat pipe. This limit can be addressed by improving the wick to increase the capillary force, or by improvements to the vapor flow path to reduce the pressure difference. The sonic limit represents the velocity when choked flow will occur, at which point more fluid cannot be transported by the heat pipe. This limit can be addressed by larger flow areas or lower power. The arrangement of the heat pipes 220 increases the vapor and liquid flow area along the length of the heat pipes 220 compared to conventional heat pipes having a constant flow area, without exceeding the capillary and sonic limits, and therefore provides improved heat transfer. Specifically, the increase in flow area limits the increase in vapor velocity that typically occurs in the evaporator section of a heat pipe. This allows the branching heat pipes 220 to draw more heat before encountering an operational limit.

In another aspect of the present technology, the branching heat pipes 220 also have an increasing surface area in the radial direction (e.g., in the direction indicated by the arrow R in FIG. 2A). This allows for a relatively high effective contact surface area between the heat pipes 220 and the fuel 226—providing more surface area to attach the fuel 226 to—and thereby allowing for the fuel 226 to be made thinner and to be spread out across the larger surface area. Further, the branching heat pipes 220 can provide additional surface area, which in turn provides more radially uniform cooling in the condenser region near the outward termini 225.

Branching also reduces the number of separate heat pipes 220 needed in the core region 116. For example, a single one of the branching heat pipes 220 can cover a section of the core region 116 with multiple flow exits from the evaporator region. Accordingly, the branching heat pipes 220 reduce the volume of pipes within the core region 116 for the same heat removal rate (e.g. the same evaporator exit flow area). Because fewer pipes can be used, the heat exchanger 108 (FIG. 1) can be made more compact and/or more of the fuel 226 and/or the control material 117 (e.g., a moderator) can be included in the core region 116. In sum, the present technology provides a means for increasing the heat removal capacity of the system 100 while reducing a fraction of the volume of the core region 116 needed for heat removal.

Figure 4A:
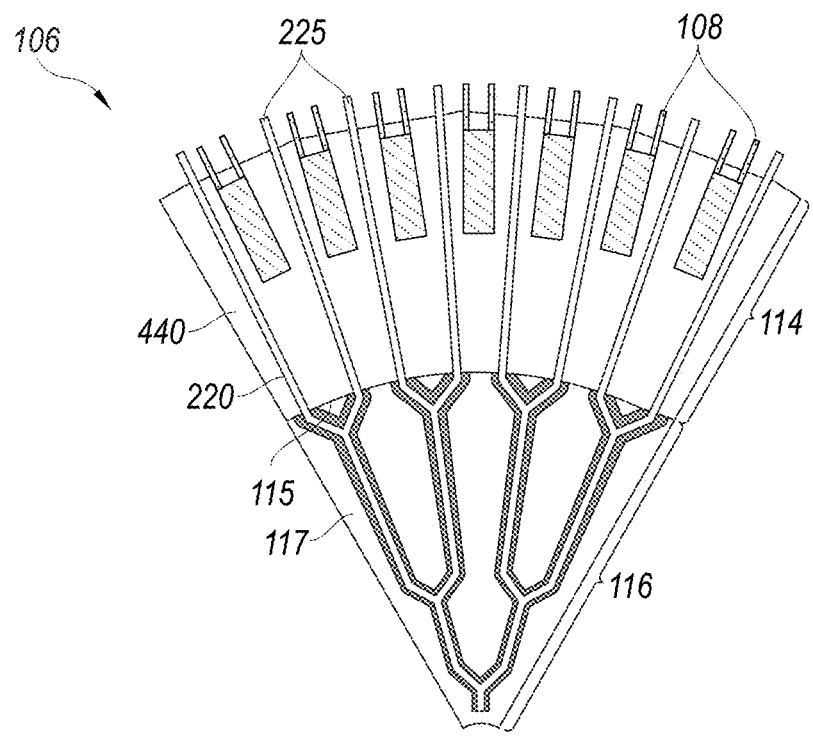
FIGS. 4A and 4B are enlarged top cross-sectional views of the portion of the nuclear reactor system shown in FIG. 2B and illustrating a heat exchanger of the nuclear reactor system configured in accordance with embodiments of the present technology.
Figure 4B:
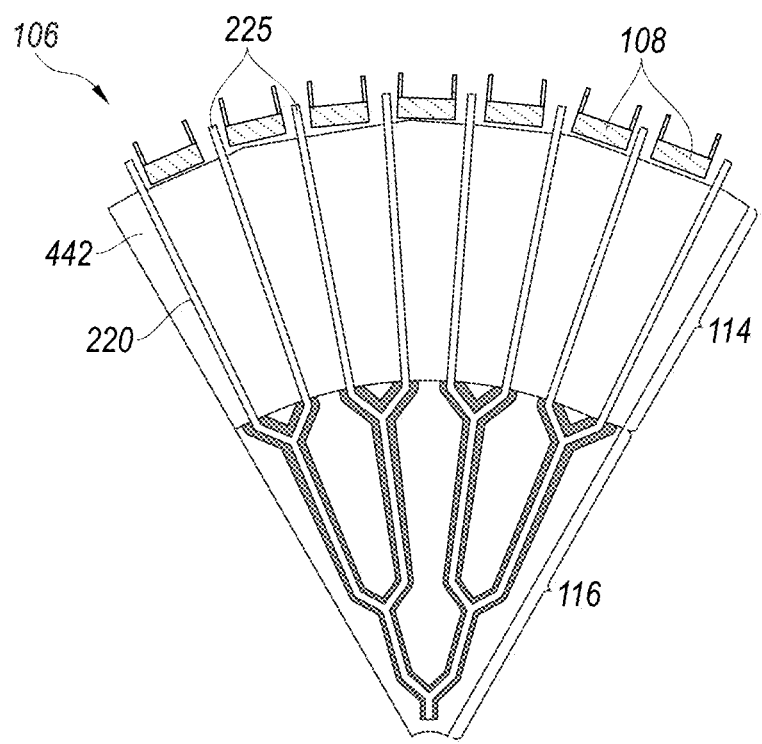

FIGS. 4A and 4B are enlarged top cross-sectional views of the portion of the system 100 shown in FIG. 2B and illustrating the heat exchanger 108 in accordance with embodiments of the present technology. Referring first to FIG. 4A, in some embodiments the heat exchanger 108 can be positioned within the reflector region 114 proximate to the outward termini 225 of the heat pipes 220 (e.g., proximate to the condenser region of the heat pipes 220). In some such embodiments, the reflector region 114 comprises a liquid 440, such as a liquid metal material (e.g., a liquid metal alloy, a liquid metal hydride) configured to reflect neutrons inward toward the core region 116. In some embodiments, the heat exchanger 108 can be directly coupled/attached to the heat pipes 220 and/or their supporting structure while, in other embodiments, the heat exchanger 108 can be spaced apart from the heat pipes 220 in the reflector region 114. For example, the liquid 440 can act as a heat transfer medium for transferring heat from the heat pipes 220 to the heat exchanger 108. In some embodiments, the core barrier 115 can separate the liquid 440 in the reflector region 114 from the control material 117 in the core region 116, and the heat pipes 220 can penetrate through the core barrier 115. In one aspect of the present technology, the thermal properties of the liquid 440 in the reflector region 114 can help distribute heat around the heat exchanger 108, and thereby inhibit failure of the heat exchanger 108 from a failure of any of the heat pipes 220.

Referring next to FIG. 4B, in some embodiments the heat exchanger 108 can be positioned radially outside of the reflector region 114 proximate to the outward termini 225 of the heat pipes 220 (e.g., proximate to the condenser region of the heat pipes 220). In some such embodiments, the reflector region 114 comprises a solid material 442 configured to reflect neutrons inward toward the core region 116. Accordingly, the heat pipes 220 can penetrate through the solid material 442.

Referring to FIGS. 1-2C, 4A, and 4B together, in some embodiments the core region 116 can include the control material 117 at least partially surrounding the heat pipes 220 and the fuel 226 in the core region 116. In the illustrated embodiment, the control material 117 terminates at the edge of the core region 116 and thus entirely surrounds the fuel 226. In other embodiments, the control material 117 can extend at least partially into the reflector region 114 and can act as part of the reflector. In yet other embodiments, the control material 117 can be omitted.

The control material 117 can be a moderator configured to control the reactivity of the system 100 and/or a coolant configured to distribute heat between the heat pipe layers 106. In some embodiments, the control material 117 can be a liquid moderator including, for example, a metal hydride that can be used to control the reactivity of the fuel 226 by adding or removing hydrogen from the system 100. More particularly, the control material 117 can be a mixture of calcium hydride (e.g., $CaH_2$), calcium bismuth (Bi—Ca), and/or other suitable compounds. Such mixtures can undergo reversible conversions between metal and metal hydride based on the hydrogen content of the system 100 and, accordingly, can be used as a moderator to control a reactivity of the fuel 226 based on the state of the control material 117. For example, in some embodiments the system 100 can include a hydrogen control system 119 (FIG. 1) configured to vary a hydrogen content level of the core region 116 to thereby control the state of the control material 117 and thus its moderating properties. The control material 117 can also act as a coolant to evenly distribute heat between the heat pipe layers 106. For example, if one or more of the heat pipes 220 fail, the control material 117 can help transfer heat from the fuel 226 around the failed one of the heat pipes 220 to other, functioning heat pipes 220 for removal from the system 100. In one aspect of the present technology, the control material 117 therefore reduces thermal-gradient induced stresses arising from heat pipe failures and simplifies the structural design of the core region 116.

In addition to or alternatively to the control material 117, the system 100 can include one or more control rods (not shown), such as a boron control rod, configured to absorb (e.g., poison) neutrons in the core region 116 that may otherwise induce fission of the fuel 226. Such control rods can help facilitate startup and shutdown of the system 100.

Figure 5A:
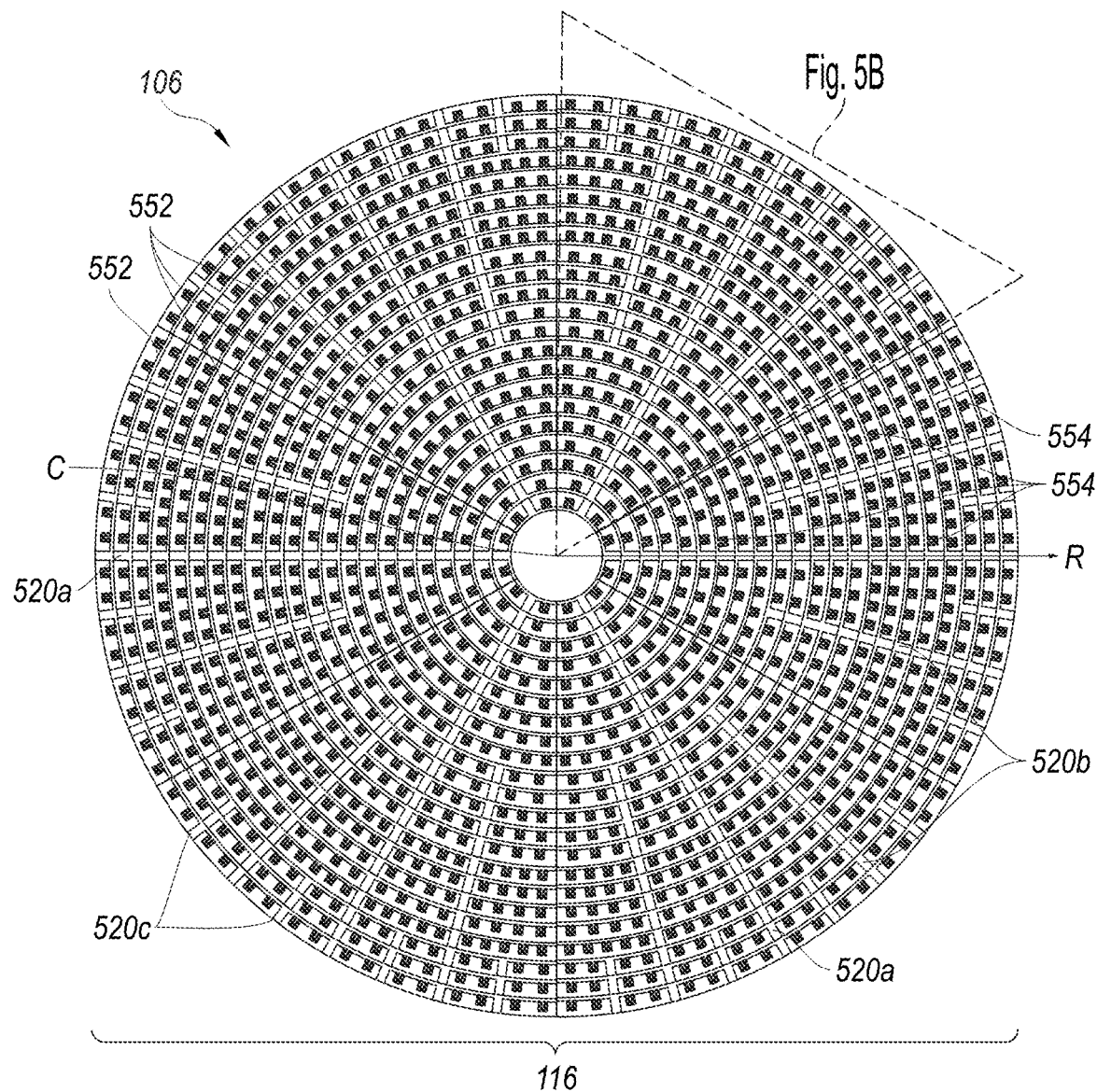
FIGS. 5A-5C are a top cross-sectional view, an enlarged top cross-sectional view, and a further enlarged top cross-sectional view, respectively, of the core region of a nuclear reactor system configured in accordance with additional embodiments of the present technology.
Figure 5B:
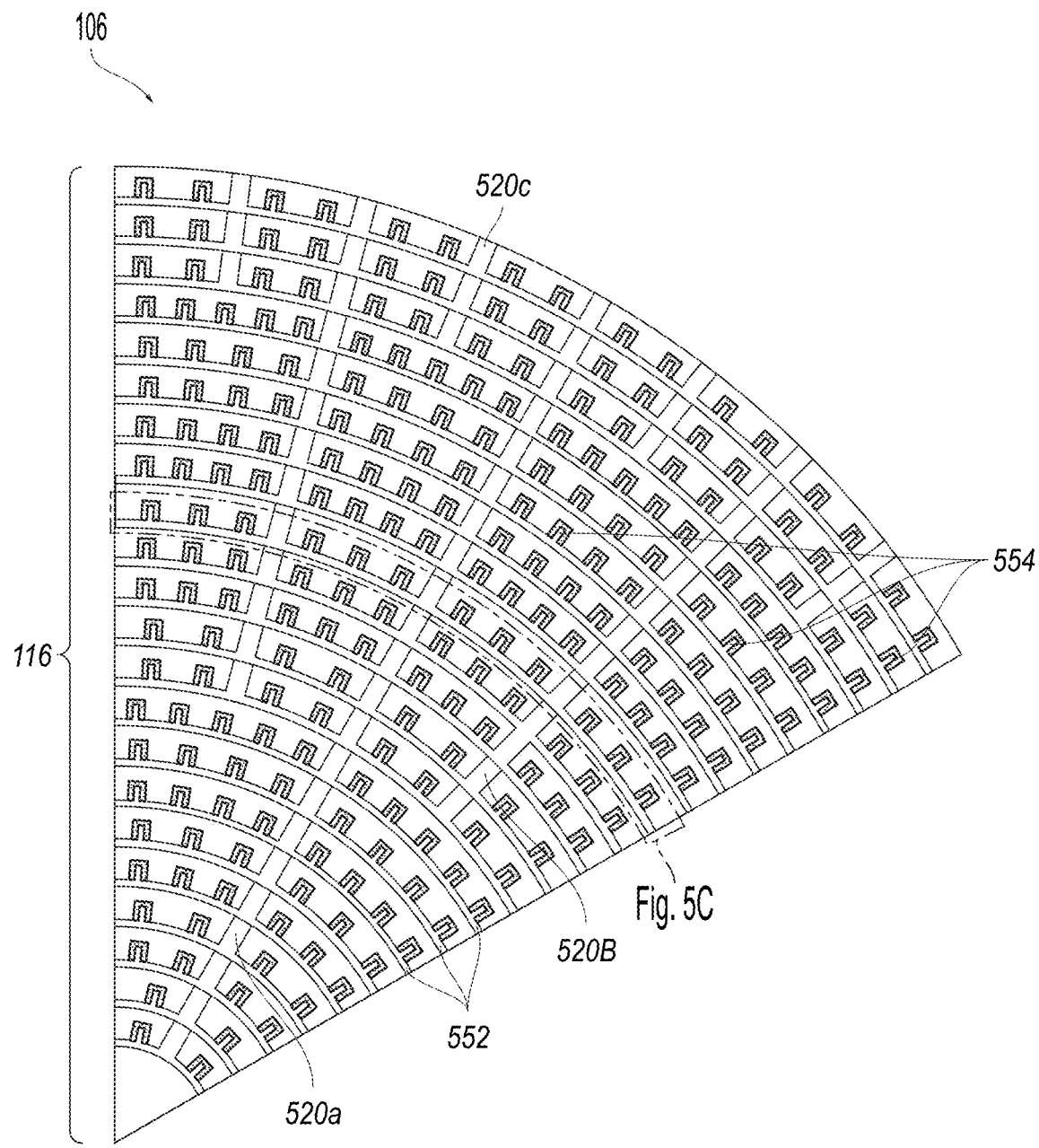
Figure 5C:
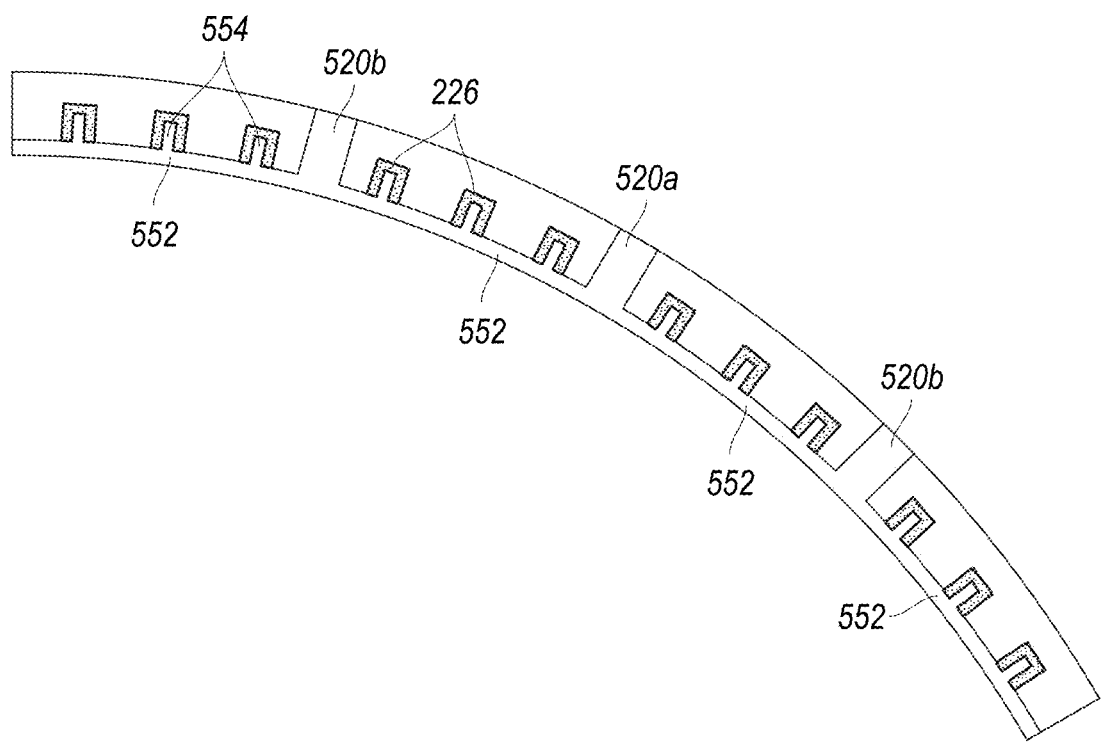

FIGS. 5A-5C are a top cross-sectional view, an enlarged top cross-sectional view, and a further enlarged top cross-sectional view, respectively, of a portion of one of the heat pipe layers 106 positioned at the core region 116 in accordance with additional embodiments of the present technology. Some of the features and associated functionality of the heat pipe layer illustrated in FIGS. 5A and 5B can be generally similar to or identical to the features and/or functionality of the heat pipe layer described in detail with respect to FIGS. 2A-4B. For example, referring to FIGS. 5A-5C together, the heat pipe layer 106 includes a network of interconnected heat pipes. In the illustrated embodiment, however, the heat pipe layer 106 includes (i) arterial heat pipes 520 (e.g., arterial flow paths; identified individually as first through third arterial heat pipes 520a-520c) extending radially outward in a direction indicated by the arrow R away from the central axis C of the heat pipe layer 106 (FIG. 5A) and (ii) off-branching heat pipes 552 (e.g., off-branching flow paths) extending circumferentially relative to the central axis C and connecting two or more of the arterial heat pipes 520.

In the illustrated embodiment, the first arterial heat pipes 520a extend farther radially inward than the second and third arterial heat pipes 520b, c, and the second arterial heat pipes 520b extend farther radially inward than the third arterial heat pipes 520c. Moreover, the arterial heat pipes 520 can be generally equally spaced circumferentially about the central axis C, and the number of the third arterial heat pipes 520c can be greater (e.g., double) the number of the second arterial heat pipes 520b, the number of second arterial heat pipes 520b can be greater (e.g., double) the number of the first arterial heat pipes 520a, and so on. Accordingly, the arterial heat pipes 520 can form an alternating/interleaved arrangement in which each of the first arterial heat pipes 520a is directly adjacent to two (e.g., a pair) of the second arterial heat pipes 520b, each of the second arterial heat pipes 520b is directly adjacent two of the third arterial heat pipes 520c, and so on. In other embodiments, the core region 116 can have more or fewer of the arterial heat pipes 520, and/or the arterial heat pipes 520 can be arranged differently (e.g., asymmetrically). The arterial heat pipes 520 contain a working fluid and provide a heat removal path at least partially through the reflector region 114 (FIG. 1) to the heat exchanger 108 (FIG. 1).

The off-branching heat pipes 552 each extend between and connect an adjacent pair of the arterial heat pipes 520 (e.g., a circumferentially adjacent pair). The arterial heat pipes 520 and the off-branching heat pipes 552 (collectively "heat pipes 520, 552") can all be fluidly connected together, or two or more different subsets of the heat pipes 520, 552 can be fluidly connected together. For example, a subset or branch of the heat pipes 520, 552 can be connected together, such as a wedge-shaped branch shown in FIG. 5B including one of the first arterial heat pipes 520a, an adjacent two of the second arterial heat pipes 520b, an adjacent four of the third arterial heat pipes 520c, and so on.

In the illustrated embodiment, the off-branching heat pipes 552 each include one or more (e.g., two or more) evaporator heads 554. Referring to FIG. 5C, the fuel 226 can be positioned around/proximate to the evaporator heads 554. For example, in the illustrated embodiment the fuel 226 is directly attached to the evaporator heads 554 (e.g., via a HIP process) such that there is no gap or a small gap between the evaporator heads 554 and the fuel 226. In other embodiments, the fuel 226 can be inserted into slots on the evaporator heads 554. In some embodiments, the evaporator heads 554 can be evenly spaced apart from another along the off-branching heat pipes 552 such that the number of evaporator heads 554 increases in the radial direction as the length and/or number of the off-branching heat pipes 552 increases.

Referring again to FIGS. 5A-5C together, during operation of the system 100, the fuel 226 generates heat that is transferred to the evaporator heads 554 to evaporate/vaporize the working fluid therein and/or in the off-branching heat pipes 552. The evaporated working fluid then flows circumferentially toward one or both of the connected arterial heat pipes 520, and then radially outward along the arterial heat pipes 520 through the reflector region 114 (FIG. 1) toward the heat exchanger 108 (FIG. 1) where the working fluid cools, condenses, and transfers heat to the heat exchanger 108. The heat pipes 520, 552 can include wicks (e.g., as described in detail with reference to FIG. 2C) configured to transport the condensed/cooled working fluid against the pressure gradient in the heat pipes 520, 552 to the evaporator heads 554 where the working fluid can be heated and vaporized once again. Accordingly, the heat pipes 520, 552 remove heat from the fuel 226 and transport the heat radially outward toward the heat exchanger 108 (FIG. 1).

Similar to the embodiments described above with reference to FIGS. 2A-4B, the arrangement of the heat pipes 520, 552 provides an increasing flow area in the radial direction (e.g., in the direction indicated by the arrow R). That is, the network of heat pipes 520, 552 originates from near a common point (e.g., the central axis C) and grows in flow area as the number and/or length of heat pipes 520, 552 increases in the radial direction. As described in detail above, this arrangement can increase the heat removal capacity of the heat pipes 520, 552 as compared to conventional heat pipes having a single pipe of constant flow area. Likewise, in some embodiments the control material 117 can at least partially surround the heat pipes 520, 552 and the fuel 226 in the core region 116.

Referring again to FIG. 1, in other embodiments the heat pipe layers 106 can each comprise one or more disk-shaped (e.g., circular) planar heat pipes. In some embodiments, fuel elements having a corresponding flat disk shape can be attached to the heat pipes in the core region 116. That is, the heat pipe layers 106 can be positioned between corresponding flat fuel elements. Such embodiments can provide a relatively simple arrangement that still provides a relatively high vapor flow area and high surface area for contact with the fuel.

Referring to FIGS. 1-5C together, the heat pipe layers 106 can each be identical. In other embodiments, the configurations of the heat pipe layers 106 can be varied. For example, some of the heat pipe layers 106 can include the network of heat pipes 220 shown in FIGS. 2A-2C, while some of the heat pipe layers 106 include the network of heat pipes 520, 552 shown in FIGS. 5A-5C, and/or while some of the heat pipe layers 106 include flat disk-shaped heat pipes.

In one aspect of the present technology, the number of heat pipe layers 106 can be varied to vary the amount of fuel 226 in the system 100, and thus the power/heat output of the system 100. In another aspect of the present technology, the heat pipe layers 106 can be loosely coupled (e.g., via a plurality of flexible joints) to the frame 109 and/or the other ones of the heat pipe layers 106. This can allow the heat pipe layers 106 to expand/contract independently due to heat and/or irradiation—thereby reducing mechanical stress on the heat pipe layers 106, the frame 109, and/or other components of the system 100. Similarly, all or a subset of the heat pipes in each of the heat pipe layers 106 can expand/contract independently due to heat and/or irradiation. For example, each of the wedge-shaped branches of the heat pipes 220 (e.g., the branch shown in FIG. 2B) or the heat pipes 520, 552 (e.g., the branch shown in FIG. 5B) can move independently of the other wedge-shaped branches in the heat pipe layer 106.

In some embodiments, to refuel the system 100, one or more of the heat pipe layers 106—and the fuel 226 attached to or otherwise associated therewith—can be removed and replaced and/or shifted to another location within the stack of heat pipe layers 106. Similarly, in some embodiments one or more of the independent branches of the heat pipes can be shifted/moved during a refueling process. In another aspect of the present technology, the modular nature of the heat pipe layers 106 can enable the heat pipe layers 106 to be manufactured/fabricated in parallel and subsequently assembled.

The following examples are illustrative of several embodiments of the present technology:

1. A nuclear reactor, comprising:
   a heat pipe network including an evaporator region, an adiabatic region, and a condenser region, wherein the heat pipe network defines a plurality of flow paths having an increasing cross-sectional flow area in a direction from the evaporator region toward the condenser region; and
   nuclear fuel thermally coupled to at least a portion of the evaporator region, wherein the heat pipe network is positioned to transfer heat received from the fuel at the evaporator region to the condenser region.
2. The nuclear reactor of example 1 wherein the nuclear fuel is directly attached to the evaporator region.
3. The nuclear reactor of example 2 wherein the nuclear fuel is a uranium molybdenum alloy pressed onto the evaporator region.
4. The nuclear reactor of any one of examples 1-3 wherein the nuclear reactor further comprises a liquid metal moderator at least partially surrounding the evaporator region, and wherein the liquid metal moderator is positioned to control a reactivity of the nuclear fuel.
5. The nuclear reactor of any one of examples 1-4 wherein the nuclear reactor further comprises a reflector positioned to reflect neutrons resulting from fission of the nuclear fuel, and wherein at least a portion of the heat pipe network extends through the reflector.
6. The nuclear reactor of example 5 wherein the adiabatic region extends away from the evaporator region through the reflector, and wherein the condenser region is positioned outside the reflector.
7. The nuclear reactor of any one of examples 1-6, further comprising a heat exchanger thermally coupled to the condenser region.
8. The nuclear reactor of any one of examples 1-7 wherein individual ones of the flow paths branch into two or more portions in the direction from the evaporator region toward the condenser region.
9. The nuclear reactor of any one of examples 1-8 wherein individual ones of the flow paths include (a) a first portion proximate a central axis of the heat pipe network, (b) a pair of second portions branching from the first portion, (c) a pair of third portions branching from each of the second portions, and (d) a pair of fourth portions branching from each of the third portions.
10. The nuclear reactor of example 9 wherein the nuclear fuel is thermally coupled to the first portion, the second portions, and the third portions of the flow paths.
11. The nuclear reactor of example 10 wherein the nuclear reactor further comprises a reflector positioned to reflect neutrons resulting from fission of the nuclear fuel, and wherein the fourth portions extend through the reflector.
12. The nuclear reactor of any one of examples 1-11 wherein the heat pipe network includes (a) arterial flow paths extending radially away from a central axis of the heat pipe network and (b) off-branching flow paths extending circumferentially about the central axis and connecting circumferentially adjacent pairs of the arterial flow paths.
13. The nuclear reactor of example 12 wherein individual ones of the off-branching flow paths include one or more evaporator heads, and wherein the nuclear fuel is directly attached to the evaporator heads.
14. A nuclear reactor, comprising:
    a plurality of heat pipe layers, wherein individual ones of the heat pipe layers include (a) a heat pipe network extending radially outward from a central axis and (b) fissile material thermally coupled to at least a portion of the heat pipe network, and wherein the heat pipe network has an increasing cross-sectional flow area in a radially-outward direction from the central axis;
    a reflector positioned to reflect neutrons resulting from fission of the fissile material in a radially-inward direction toward the central axis, wherein the heat pipe networks in individual ones of the heat pipe layers extend at least partially through the reflector; and
    a heat exchanger thermally coupled to the heat pipe layers, wherein the heat pipe layers are positioned to transfer heat received from the fissile material to the heat exchanger.
15. The nuclear reactor of example 14 wherein the heat pipe layers are stacked one over another.
16. The nuclear reactor of example 14 or example 15 wherein the heat pipe layers are coupled to and supported by a frame.
17. The nuclear reactor of any one of examples 14-16 wherein the reflector comprises a solid material, and wherein the heat exchanger is positioned radially outside of the reflector.
18. The nuclear reactor of any one of examples 14-17 wherein the reflector comprises a fluid, wherein the heat exchanger is positioned at least partially within the fluid, and wherein the fluid is in thermal contact with the fluid and the heat pipe layers to transfer heat from the heat pipe networks to the heat exchanger.

19. A method of forming a nuclear reactor component, the method comprising: positioning a heat pipe in a pressure vessel; providing a powdered nuclear fuel material on at least a portion of the heat pipe; and increasing a pressure and a temperature in the pressure vessel to solidify the nuclear fuel material and directly attach the nuclear fuel material to the heat pipe.

20. The method of example 19 wherein the nuclear fuel material is a fissile material.

21. The method of example 19 or example 20 wherein the nuclear fuel material is uranium molybdenum alloy.

22. The method of any one of examples 19-21 wherein increasing the pressure in the pressure vessel includes pumping an inert gas into the pressure vessel.

23. The method of any one of examples 19-22 wherein providing the powdered nuclear fuel material on at least the portion of the heat pipe includes providing the powdered nuclear fuel material on an evaporator region of the heat pipe, wherein the heat pipe further includes a condenser region, and wherein the heat pipe defines a flow path having an increasing cross-sectional flow area in a direction from the evaporator region toward the condenser region.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, other embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and A and B. To the extent any materials incorporated herein by reference conflict with the present disclosure, the present disclosure controls. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A nuclear reactor, comprising:
a heat pipe network extending radially outward from a central axis and including an evaporator region, an adiabatic region, and a condenser region, wherein the adiabatic region is farther from the central axis than the evaporator region, wherein the condenser region is farther from the central axis than the adiabatic region, wherein the heat pipe network defines a plurality of flow paths having an increasing cross-sectional flow area in a radial direction away from the central axis such that the cross-sectional flow area is greater along an entire length of the condenser region than along an entire length of the evaporator region, and wherein individual ones of the flow paths branch into two or more portions in the radial direction; and
nuclear fuel thermally coupled to at least a portion of the evaporator region, wherein the heat pipe network is positioned to transfer heat received from the fuel at the evaporator region to the condenser region.

2. The nuclear reactor of claim 1 wherein the nuclear fuel is directly attached to the evaporator region.

3. The nuclear reactor of claim 2 wherein the nuclear fuel is a uranium molybdenum alloy pressed onto the evaporator region.

4. The nuclear reactor of claim 1 wherein the nuclear reactor further comprises a liquid metal moderator at least partially surrounding the evaporator region, and wherein the liquid metal moderator is positioned to control a reactivity of the nuclear fuel.

5. The nuclear reactor of claim 1 wherein the nuclear reactor further comprises a reflector positioned to reflect neutrons resulting from fission of the nuclear fuel, and wherein at least a portion of the heat pipe network extends through the reflector.

6. The nuclear reactor of claim 5 wherein the adiabatic region extends away from the evaporator region through the reflector, and wherein the condenser region is positioned outside the reflector.

7. The nuclear reactor of claim 1, further comprising a heat exchanger thermally coupled to the condenser region.

8. A nuclear reactor, comprising:
a heat pipe network including an evaporator region, an adiabatic region, and a condenser region, wherein the heat pipe network defines a plurality of flow paths having an increasing cross-sectional flow area in a direction from the evaporator region toward the condenser region, and wherein individual ones of the flow paths include (a) a first portion proximate a central axis of the heat pipe network, (b) a pair of second portions branching from the first portion, (c) a pair of third portions branching from each of the second portions, and (d) a pair of fourth portions branching from each of the third portions; and
nuclear fuel thermally coupled to at least a portion of the evaporator region, wherein the heat pipe network is positioned to transfer heat received from the fuel at the evaporator region to the condenser region.

9. The nuclear reactor of claim 8 wherein the nuclear fuel is thermally coupled to the first portion, the second portions, and the third portions of the flow paths.

10. The nuclear reactor of claim 9 wherein the nuclear reactor further comprises a reflector positioned to reflect neutrons resulting from fission of the nuclear fuel, and wherein the fourth portions extend through the reflector.

11. The nuclear reactor of claim 1 wherein the heat pipe network includes (a) arterial flow paths extending radially away from a central axis of the heat pipe network and (b) off-branching flow paths extending circumferentially about the central axis and connecting circumferentially adjacent pairs of the arterial flow paths.

12. The nuclear reactor of claim 11 wherein individual ones of the off-branching flow paths include one or more evaporator heads, and wherein the nuclear fuel is directly attached to the evaporator heads.

13. A nuclear reactor, comprising:
- a plurality of heat pipe layers, wherein individual ones of the heat pipe layers include (a) a heat pipe network extending radially outward from a central axis and (b) fissile material thermally coupled to at least a portion of the heat pipe network, and wherein the heat pipe network has an increasing cross-sectional flow area in a radially-outward direction from the central axis;
- a reflector positioned to reflect neutrons resulting from fission of the fissile material in a radially-inward direction toward the central axis, wherein the heat pipe networks in individual ones of the heat pipe layers extend at least partially through the reflector; and
- a heat exchanger thermally coupled to the heat pipe layers, wherein the heat pipe layers are positioned to transfer heat received from the fissile material to the heat exchanger.

14. The nuclear reactor of claim 13 wherein the heat pipe layers are stacked one over another.

15. The nuclear reactor of claim 13 wherein the heat pipe layers are coupled to and supported by a frame.

16. The nuclear reactor of claim 13 wherein the reflector comprises a solid material, and wherein the heat exchanger is positioned radially outside of the reflector.

17. The nuclear reactor of claim 13 wherein the reflector comprises a fluid, wherein the heat exchanger is positioned at least partially within the fluid, and wherein the fluid is in thermal contact with the fluid and the heat pipe layers to transfer heat from the heat pipe networks to the heat exchanger.

\* \* \* \* \*